Patented Oct. 29, 1929

1,733,493

UNITED STATES PATENT OFFICE

LESTER KIRSCHBRAUN, OF CHICAGO, ILLINOIS

BITUMINOUS EMULSION

No Drawing. Application filed May 7, 1924. Serial No. 711,634.

This invention relates to improvements in bituminous emulsions and refers more particularly to the production of emulsified paints or analogous plastic compositions in which coloring material may be introduced to produce ornamental effects. This application is a continuation in part of my co-pending application Serial No. 72,818, which in turn is a continuation of Serial No. 522,727, filed December 15, 1921, a division of my Patent No. 1,469,563.

In order to produce the product of this invention it is necessary to use as the base or binder of the emulsified product, a colorable cement. This colorable cement should preferably be an adhesive waterproof cementitious and fusible product, partaking of the general nature of pitch of a varying degree of softness.

The primary object of the invention is to first produce an emulsion of a character susceptible to inversion and the like with a sensitive emulsifying agent and in thereafter adding to the emulsion thus formed a stabilizing agent of predetermined character or amount relative to the emulsifying agent employed, said stabilizing agent having substantially no emulsive functions and not tending to substantially alter the previously formed bituminous particles initially emulsified.

More particularly the invention relates to emulsions of animal or vegetable pitches, wax tailings, either soft or reduced by steam distillation to a harder consistency, or there may be employed any known gums and resins such as are used in the paint industry, synthetic resins, Montan wax or analogous waxy products, all of these being either used alone or in combination, or fluxed, and softened with thinning oils such as linseed oil, Chinawood oil, or other drying and non-drying oils.

Gilsonite may also be used as a constituent of this paint base provided it is combined with a sufficient amount of the more readily colorable materials so as not to affect injuriously the capacity of the base or cement to develop the ornamental colors imparted by a reasonable amount of coloring matter.

In some instances these bases or cements, as I shall term them, may be used with the coloring materials intimately mixed into the cement or pitch base by addition of the dry pigment with agitation, or by addition of the pigment previously ground in a fluxing or thinning oil medium.

The product of this invention is particularly useful as a coating upon previously laid roofing, either of the slate surfaced variety or the rubber roofing of commerce.

It has the advantage that it will contain no volatile oils such as are carried by the usual paints, but will be distributed as an aqueous emulsion, the result being that the paint film deposited upon the asphalt or other surface, does not become dissolved by solvents but covers, without bringing through the newly applied paint, an asphaltic or bituminous material from the surface upon which it is applied.

When used for this purpose it is highly desirable that the paint base or cement be compounded of such of the constituents named above as will produce a non-oxidizable film, the object being to provide a covering or paint which will remain soft, pliable and which will retain its life without oxidation, for the longest period of time.

The paint base described above may be emulsified in any well known manner by the use of a wide variety of emulsifying agents. This may include soaps, casein, dextrin, sulphonated oils, argillaceous materials, or any other emulsifying agent that is capable of producing fine dispersion of the cement particles as the internal phase in an aqueous vehicle.

It is important to note however that while a wide variety of these agents are capable of producing this dispersion, it is important that the emulsion so produced be stable.

It is a characteristic of many emulsions produced with soaps, sulphonated oils and the like, that they are exceedingly sensitive to inversion by many agents; for instance, by the addition of fine mineral powders such as would be represented by pigments, or they may be broken merely by the action of a brush with which it may be attempted to distribute them in paint film.

This invention therefore is concerned with the method herein described of stabilizing such emulsions, sensitive to inversion by the addition to the emulsion, after its formation, of one of the stabilizing agents hereinafter pointed out.

The result of such an unstable emulsion is to produce a product which cannot be used as a paint on account of its tendency to gum the brush or to be incapable of remaining permanently in suspension or to be incompatible with the presence of certain pigments, or to withstand freezing. It will be understood, however, that the product of the present invention must comprise an emulsion so stabilized by the addition of a stabilizing agent, as to possess a desired stability and to be capable of continuous and practical application with a brush, or similar methods of spreading, without any of the defects referred to above.

Emulsions prepared with sensitive emulsifying agents if normally unstable, may be stabilized to a degree by adding to the emulsion a protective colloid, or by adding the unstable emulsion to finely divided mineral matter, preferably colloidal, sometimes in a dry, but more particularly, while the latter is in paste form.

Emulsions using emulsifying agents such as soap, sulphonated oils and analogous substances, may be prepared in any well known manner, which frequently comprises the introduction of the water containing the emulsifying agent directly into the molten base, and subsequent agitation, all in proper proportions.

Thereafter, as herein stated, the emulsion containing either of these sensitive emulsifying agents or other like agents may be stabilized against inversion due to rubbing action or to admixture with other agents as pointed out on page 3 by adding to the emulsion, after its formation, a suitable protective colloid constituting a stabilizer, in varying quantities or amounts in accordance with the type of sensitive emulsifying agent present or the use for which the emulsion is to be applied.

It is also possible to produce emulsions of this character by introducing streams of the base and aqueous emulsifying agent in regulated quantities to a colloid mill.

Emulsions of this type, as for example, where the emulsifying agent comprises one to two per cent of rosin soap, are usually so unstable as to break up as described heretofore. These emulsions may be stabilized by the addition thereto of a protective colloid or stabilizer which may, in some instances, be added to the unstable emulsion and in other instances, as where colloidal clay is employed, as the stabilizer, the unstable emulsion is preferably added to the clay slowly, the latter being either in powdered or pasty form. In certain instances, metallic oxides, as well as antimony oxide or red oxide of iron or ochres which are also pigments, may be likewise employed as stabilizers. A large variety of emulsifying agents may, in connection with a different emulsifying agent, act as a stabilizer, but it must be understood that stabilizing agents other than emulsifying agents, capable of directly emulsifying the base may be used. In addition to the argillaceous stabilizing agents mentioned above, it may be desirable to use concentrated sulphite liquor, gelatine, and the reaction product of an alkali on leather.

At this time I am unable to state any generalization for pre-determining the proper stabilizer to be used with an emulsion prepared with a given emulsifying agent except that the stabilizing agent should not tend to change the charge upon the dispersed particles. Further than this, the proper stabilizing agent to be used must be determined by trial, the controlling factors in this particular residing in the character and amount of the stabilizing agent relative to the emulsifying agent used. The character or amount of the stabilizing agent employed is of course readily determinable by the skilled operator. For instance, if it is desired to stabilize a soap emulsion against the brushing action herein referred to, approximately 4.5% of colloidal clay is sufficient. The same soap emulsion requires about 14% of the same colloidal clay to stabilize it against Portland cement and about 25.5% clay to stabilize it against electrolyte such as hydrochloric acid. Further, the same emulsion when stabilized with gelatin, requires about 0.5% of gelatin to stabilize it against rubbing or brushing action; 1.0% of the gelatin to stabilize it against Portland cement and about 1.5% of the gelatin to stabilize it against certain green pigments. As stated in the preceding paragraph, however, the proper stabilizing agent or the quantity thereof should be determined by trial with the controlling factors residing in the character and amount of the stabilizing agent employed relative to the emulsifying agent used or to the use to which the emulsion is to be subjected.

By the use of the term "sensitive to inversion", as employed in the claim I intend to embrace emulsions which are sensitive to inversion against brushing or rubbing action or by the addition thereto of pigments, etc., as described herein.

I claim as my invention:

1. A stable emulsion comprising bituminous particles non-liquid at normal atmospheric temperatures emulsified in a fluid vehicle by an emulsifying agent which normally produces an emulsion unstable and susceptible to inversion when subjected to a rubbing or brushing action or admixture with pigments, the said emulsion having incorporated therewith a protective colloid constituting a stabilizing agent to increase the stability of the emulsion against inversion.

2. A coating composition comprising a stabilized emulsion of bituminous particles non-liquid at normal atmospheric temperatures emulsified in a fluid vehicle by an emulsifying agent which normally produces an emulsion unstable and susceptible to inversion when subjected to a rubbing or brushing action or admixture with pigments, the said emulsion having incorporated therewith a pigment and a protective colloid, the latter constituting a stabilizing agent to increase the stability of the emulsion against inversion under the influence of said pigment.

LESTER KIRSCHBRAUN.